United States Patent

[11] 3,619,585

[72] Inventor Richard Harvey Edmondson
Cherry Hill, N.J.
[21] Appl. No. 877,237
[22] Filed Nov. 17, 1969
[45] Patented Nov. 9, 1971
[73] Assignee RCA Corporation

[54] ERROR CONTROLLED AUTOMATIC REINTERROGATION OF MEMORY
10 Claims, 3 Drawing Figs.

[52] U.S. Cl. .......... 235/153, 340/172.5, 340/174 ED
[51] Int. Cl. .......... G11c 29/00
[50] Field of Search .......... 340/146.1, 174, 172.5; 235/153

[56] References Cited

UNITED STATES PATENTS 3,077,579 2/1963 Greene et al. .......... 340/146.1 X
3,209,327 9/1965 Brandt .......... 340/146.1
3,222,653 12/1965 Rice .......... 340/172.5
3,411,137 11/1968 Howells et al. .......... 340/172.5

*Primary Examiner*—Charles E. Atkinson
*Attorney*—H. Christoffersen

ABSTRACT: If an error is detected while reading data from a particular location in a memory, that same location is automatically reread a given number of times. If an error does not occur during the reread cycles, the program continues and the succeeding memory locations are read in normal sequence. If an error still occurs in the data after the given number of reread cycles, however, a timer or counter automatically causes a second memory location to be accessed. The latter can institute instructions for program recovery or for performing some other task such as causing a printout of the address at which the error occurred. The second location may also be preset to a given bit pattern so that if an error continues, the data read can be used to analyze the cause of error.

INVENTOR.
RICHARD HARVEY EDMONDSON
BY H. Christoffersen
Attorney

INVENTOR.
RICHARD HARVEY EDMONDSON
BY H. Christoffersen
Attorney

ERROR CONTROLLED AUTOMATIC REINTERROGATION OF MEMORY

BACKGROUND OF THE INVENTION

Electronic data processors, computers, and control devices are among the classes of cybernetic machines that use memories for storing control words. A control word is read from the memory, often called a Read Only Memory (ROM), at an address determined by the function being performed and the internal state of the machine. Certain characters or bits of the control word may be used to enable or inhibit logic gates in the machine. Other bits may be used to provide an address from which the next control word is to be read.

Unlike destructive read out memories used in such machines for storing data and programs, the accessing of a control word does not alter the contents of the memory location from which the control word was recovered. Therefore, if an error occurs because of transient interferences, it is often possible to recover the addressed control word by recycling, or reinterrogating, the ROM.

The high speed at which the machines operate make it undesirable to have an error halt the machine's operations for human intervention. Manually reinterrogating the machine's ROM is uneconomical. It is more desirable to have the reinterrogation performed automatically. However, automatic reinterrogation must be limited to a maximum number of tries else the machine will be locked in a loop of reinterrogation.

BRIEF DESCRIPTION OF THE INVENTION

Data read from a specified address in a memory is checked for errors. If an error exists, the address is prevented from changing and the date is reread. After a certain number of successive rereads having data errors, the address is set to a predetermined location.

DETAILED DESCRIPTION OF THE INVENTION

Figures 1, 2:
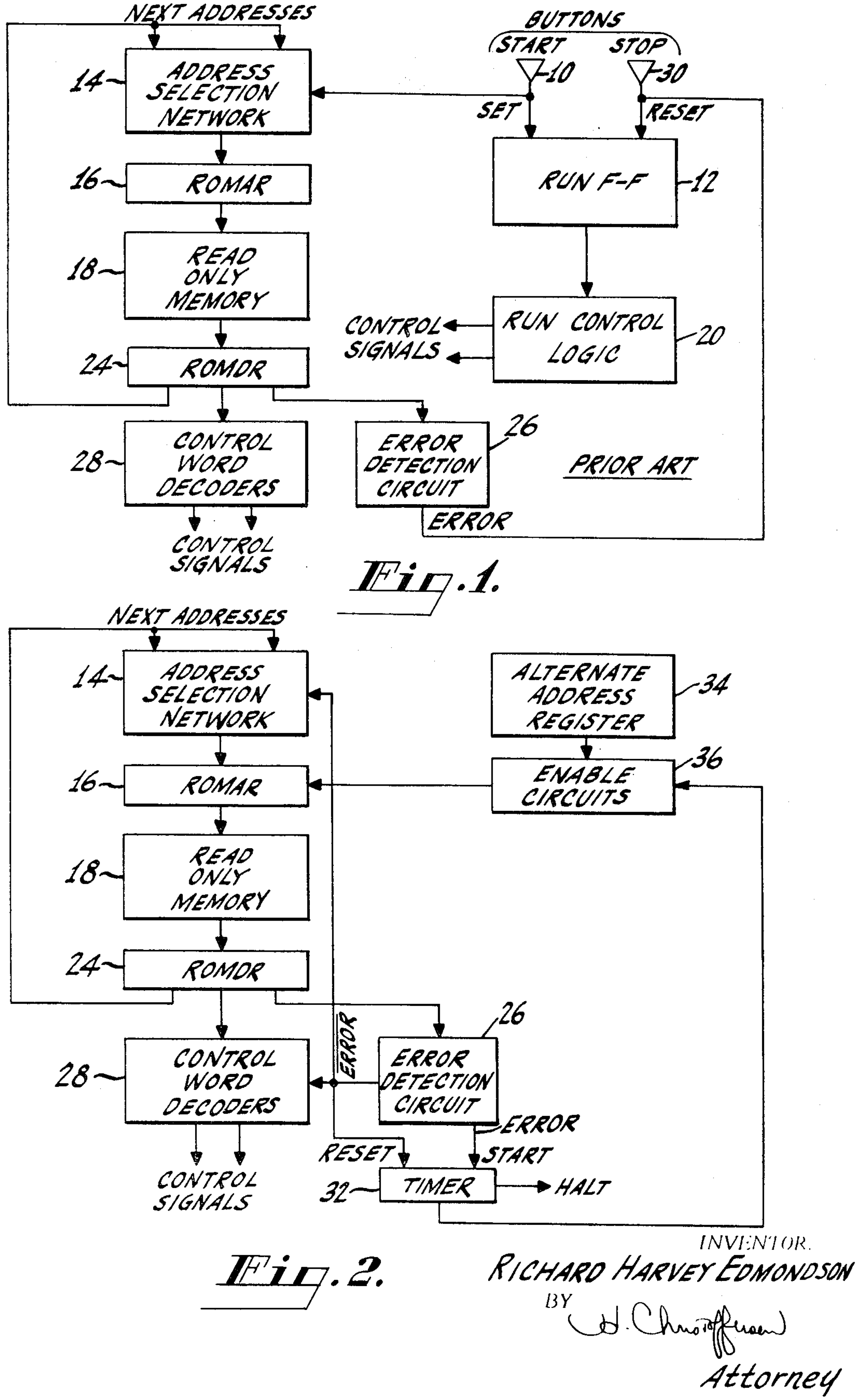
FIG. 1 is a block diagram of the control portion of a stored program data processor.
FIG. 2 is a block diagram of one embodiment of the invention.

The control system of a computer typical of the type in which the invention is most useful is shown in the block diagram of FIG. 1. The control system is used in a stored program computer wherein the sequence of operations performed in response to a particular instruction is controlled by a control word. Control words used to sequence the operation of the computer are decoded into elementary operations, sometimes called micro-operations.

Programs are lists of instructions with associated addresses stored in the computer's memory. Individual instructions thereof are sequentially retrieved and decoded in instruction registers, which are not shown in the drawing and, not being pertinent to the invention, will be not discussed further.

Assuming that the program has already been stored, the machine is started by pressing a start button 10 which sets a RUN flip-flop 12 and provides a signal to an address selection network 14. A starting address is thereby set into a read only memory address register 16. The output of the RUN flip-flop 12 enables the run control logic 20 providing appropriate timing and control signals to the processor.

The controls of the read only memory 18 at the address in the read only memory address register 16 are gated into a read only memory data register 24. Part of the control word indicates alternate addresses of the next control word to be retrieved. It is common to use at least two next addresses, one of which is gated to the address register 16 by the address selection network 14 depending on conditions within the computer processor. The use of alternate next addresses gives the processor flexibility to change its data flow paths depending on the results of preceding operations.

Other parts of the control word are used to designate registers involved in the particular operation step being performed and to control other sections of the processor such as the arithmetic unit.

Check bits are sometimes provided in the control word to detect an error in the word after it is read from memory. A common type of such a check is a parity check. In an odd-parity check system, a parity bit is set or reset as that an odd number of bits has the valve of 'one.' If the control word read from memory contains an even number of 'one' bits, the output of an error detection circuit 26 resets the RUN flip-flop 12 to stop the machine.

While the machine is running, control words are retrieved from the read only memory 18, gated into the read only memory data register 24, and decoded into signals for controlling the processor by the control word decoders 28. Timing controls, not shown, are understood to govern the sequence of operations of the various elements.

FIG. 2 is a block diagram of one embodiment of this invention. The run control logic for providing the timing control signals has been omitted because it is not pertinent to the operation of the invention. However, it should be assumed that the run control logic as well as the data processing portion of the computer are provided in addition to the control functions shown in FIG. 2.

An address selection network 14 is provided for selecting which of the next addresses is to be gated into the read only memory address register 16. The output of the read only memory 18 sets the read only memory data register 24. The control word contained in the read only memory data register 24 after a memory cycle provides addresses to the address selection network 14 and to the control word decoders 28, from which control signals are supplied to the data processing section of the computer. There is also an error detection circuit 26 such as a parity checker.

The error detection circuit 26 produces an output signal error which keeps timer 32 off and complementary signal $\overline{\text{ERROR}}$ which maintains stages 14 and 28 enabled when there is no error. The values of these signals change when there is an error in the control word in the read only memory data register 24. In response to such an error, the ERROR signal starts timer 32 and the $\overline{\text{ERROR}}$ signal inhibits network 14 and decoders 28, as discussed in more detail later.

Also included is a timer 32 which has two inputs and two outputs. The activation of one input causes the timer 32 to start. The other input resets the timer 32 to zero, i.e., initializes the time value.

One output of the timer 32 is activated a given period of time after a start command is received if no reset command has been received. The second output is activated a predetermined time interval after the other output, if the timer is not initialized during the interval.

An alternate address storage means 34 is provided, the contents of which can be varied by programming or wiring means, not shown.

Enable circuits 36 are coupled to the alternate address register 34 and transfer the alternate address into the read only memory address register 16 when activated by the first output of the timer 32.

The operation of the system shown in FIG. 2 during normal, i.e., error-free operation, will be described first. The address of a control word is gated by the address selection network 14 into the read only address register 16. The control word at the location specified by the read only address register 16 is retrieved from the read only memory 18 into the read only memory data register 24. Control signals and the next addresses, one of which addresses is selected to provide the next control word, are taken from the data register 24. If no error is detected by the error detection circuit 26, the timer is kept reset, the control signals are gated from the control word decoders 28, and the contents of the read only memory address register 16 are altered by the address selection logic 14.

When an error is detected by the error detection circuit 26, the $\overline{\text{ERROR}}$ output signal inhibits the output of the address selection network 14, preventing a change in the read only memory address register 16. It also inhibits the output of the control word decoder 28 to prevent transmitting erroneous control signals to the data processing section. The ERROR output signal of the error detection circuit 26 starts the timer 32. The system timing is cyclic so the read only memory will be reinterrogated at the address at which the error occurred.

Unlike destructive readout type memories, the read only memory 18 retains its contents even in those locations being accessed so that there is a possibility that subsequent attempts to retrieve the contents at an address where an error was detected will result in a valid control word being extracted.

The control word will be reinterrogated for several cycles depending on the period of the timer 32. At the end of the timer period, the first output of the timer 32 activates the enable circuit 36. The contents of the alternate address register 34 is thereby transferred to the read only memory address register 16.

The second output of the timer 32 halts the machine if an error is detected at the alternated address. Such a condition would occur, for example, if the malfunction were in the notify only data register 24 or the error detection logic 26.

The alternate address would normally be used to perform a subprogram to permit recovery of the program being run or to perform some other task such as activating a program that will notify the operator that an error has occurred, giving the address at which the error occurred, and so forth.

The embodiment of the invention illustrated in FIG. 2 has been shown to permit reinterrogation of the read only memory 18 for a specified period of time at the address at which an error first occurred. Then, if the error still occurs, an alternate address is provided to permit an error recovery routine or other task to be initiated.

Figure 3:
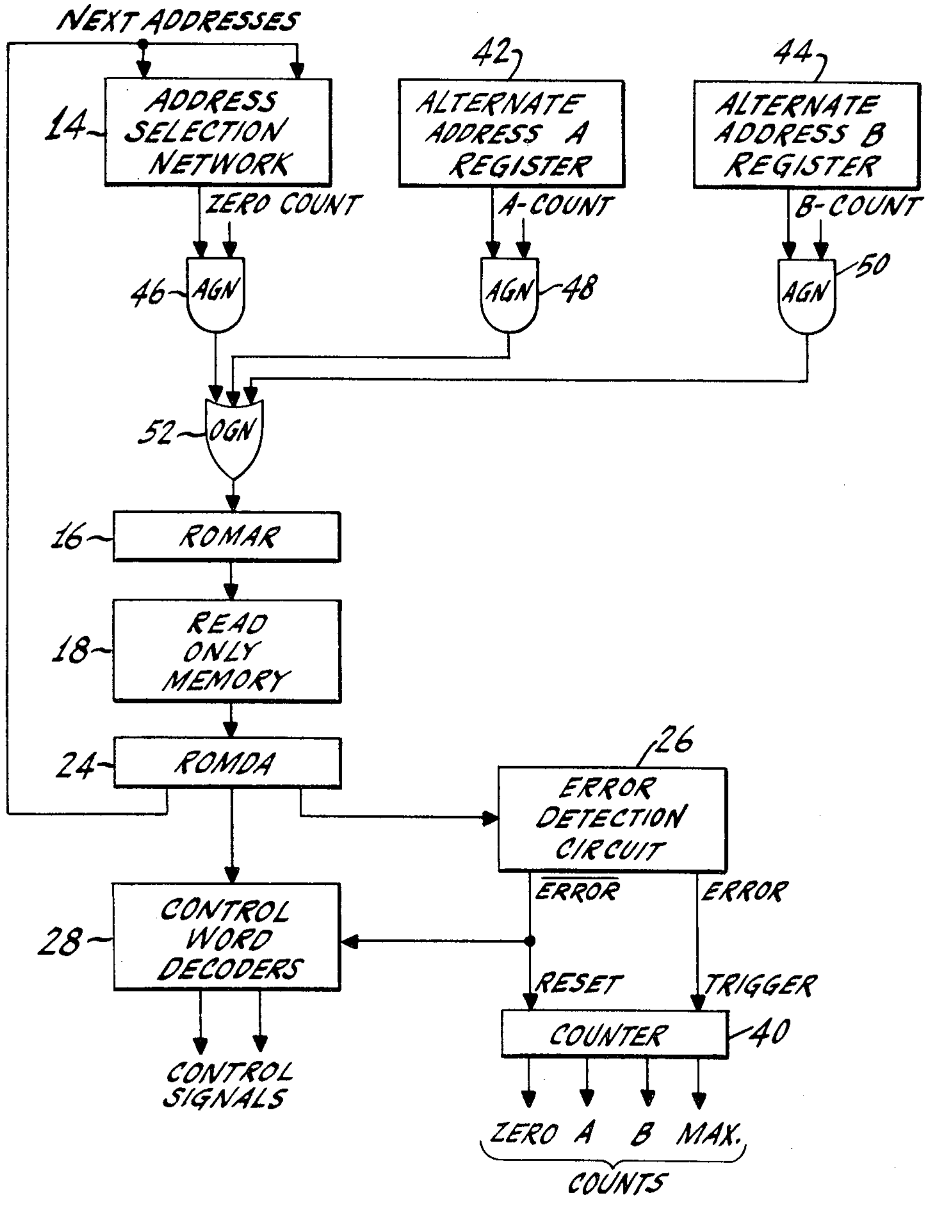
FIG. 3 is a block diagram of another embodiment of the invention.

Another embodiment of the invention is illustrated in FIG. 3. As in the first embodiment, there is the address selection network 14, the read only memory address register 16, the read only memory 18, the read only memory data register 24, the control word decoders 28, and the error detection circuit 26. Instead of the timer, a counter 40 is provided having two inputs, namely, a reset input for clearing the counter in response to a reset signal, and a trigger input for incrementing by one the contents of the counter 40 in response to each trigger signal. The counter 40 has multiple outputs, viz, an output indicating that the counter value is zero, an output indicating that the maximum valve of the counter has been reached, and various intermediate counter valves, shown in FIG. 3 as A and B.

Alternate address A and alternate address B registers 42 and 44 are provided. The outputs are connected to the AND gate networks 48 and 50, respectively. The outputs of the address selection network 14 is connected to an AND gate network 46. It is to be understood that the operation of the embodiment of the invention now to be described shows alternate addresses A and B for purposes of illustration only and that the operation thereof is not limited to two alternate addresses.

The output of the address selection network 14 is transferred to the read only memory address register 16 only when the counter contents are zero. The zero output of the counter 40 primes the AND gate network 46, the output of which is connected to the read only memory address register 16 through an OR gate network 52. During the normal (error-free) cycles of operation, the contents of the read only memory address register 16 are taken from the address selection network 14 in a manner previously described. The $\overline{\text{ERROR}}$ output signal of the error detection circuit 26 in this case, causes the output of the control word decoders 28 are gated to the processor.

An error detected by the error detection circuit 26 causes the ERROR and $\overline{\text{ERROR}}$ signals to change value. Now the $\overline{\text{ERROR}}$ signal inhibits the control signals from the control word decoders 28 and the ERROR output signal causes the contents of the counter 40 to be incremented by one. The next cycle of operation will, therefore, access the read only memory 18 at the address which remains in the read only memory address register 16. The contents of the read only memory address register 16 will not change because the output of the counter is not zero and thus the output of the address selection network 14 will not be gated to the read only memory address register 16. Furthermore, neither the A count nor the B count have been reached by the counter 40 so that the alternate addresses are not gated to the read only memory address register 16.

Each time the read only memory 18 is accessed by the address in the read only memory address register 16 at which an error occurred, successive errors will cause the trigger input of the counter to increment the contents of the counter 40 by one. In the event that the address is accessed in the read only memory 18 with no error, the counter will be reset and the operation of the computer will continue in a normal manner.

If the contents of the counter 40 are incremented to a value equal to the A counts, the output A of the counter 40 will enable the AND gate network 48. The output of the AND gate network 48 will be transmitted to the read only memory address register 16 via the OR gate network 52, causing the read only memory to be accessed at the alternate address A as designated by the alternate address A register 42.

If the contents of the read only memory 18 are read without error at this new address A, the counter will be reset and the control signals will be gated to the processor. The operation of the computer will continue in a normal manner except that a new subprogram will be executed. As stated earlier, such a subprogram would be an error recovery procedure or the like. In the event, however, that the contents of the read only memory data register 24 contain an error at the alternate address A, the contents of the counter 40 will continue to be incremented as successive reinterrogations are made until the value of the counter 40 is equal to the B count.

When the contents of the counter 40 have been incremented to the B count, the alternate address B register 44 alters the contents of the read only memory address register 16 through the AND gate network 50 and the OR gate network 52. The AND gate network 50 is primed by the B count signal output of the counter 40. The read only memory 18 is reinterrogated until either the contents are correctly extracted or until the counter value has been incremented to the maximum value.

If no error is detected by the error detection circuit 26, the counter 40 is reset and the operation of the processor continues in a normal manner but performing another subprogram. If the value of the counter 40 is incremented to its maximum value, then some other task, such as a halt, is performed.

It has been shown that the embodiment of the invention shown in FIG. 3 can be used to cause alternate addresses in the read only memory 18 to be accessed in the event of errors. The successive addresses depend on the number of errors encountered. The same principle of using several alternate addresses can be used in the embodiment shown in FIG. 2 by providing a timer with various intermediate outputs and supplying additional alternate address registers with the associated AND gate and OR gate networks.

For clarity, the invention has been explained in terms of use in a read only memory. It is also applicable to regenerative memories provided that the cause of error is not in the regenerative feedback loop. For example, in computer systems where many processors use the same remotely located memory, errors occur while transferring the data from the memory to the processor. Use of this invention permits several read attempts at one address, then, if the error continues, to try another address, the contents of which are known. The bit patterns of recovered data could then be used to analyze the cause of error. The necessity of human intervention in error recovery is minimized by the use of this invention. It has an important advantage in the large and fast complex data processing systems in use today where the amount of time required for manual intervention is equivalent to the running of tens of millions of operations. It is, therefore, feasible to perform several thousand reinterrogations at various addresses because the contents of the memory in which the control words are stored are not altered by the reading operation. Most of the errors that occur during the reading of such controls words can be traced to noise or other transient conditions so that there is a high probability that successive attempts will be successful.

We claim:

1. The combination comprising:
a memory;
addressing means for reading data from specified locations in the memory;
checking means responsive to an error in the data read from the memory for producing an error indication;
means responsive to an error indication from the checking means for preventing the addressing means from changing its address to the next specified location, whereby the same location at which an error was indicated is reread; and
control means responsive to the checking means for setting said addressing means to a predetermined address after a given number of rereads of the same location continues to produce said error indication.

2. The combination as claimed in claim 1 wherein said control means includes timing means for determining the given number of successive rereads of the same location.

3. The combination as claimed in claim 1 wherein said control means includes counting means for determining the given number of successive rereads of the same location.

4. The combination as claimed in claim 1 wherein said memory is a read only memory.

5. The combination as claimed in claim 1 wherein the data in the memory at the predetermined address comprises present data for analysis purposes.

6. The combination comprising:
nondestructive readout data storage means containing a plurality of addressable locations for storing data, having input means for specifying addresses and data output means;
first addressing means for specifying primary locations in said memory means;
second addressing means for specifying alternate locations in said memory means;
checking means coupled to the output means of the memory means for verifying validity of recovered data; and
control means responsive to said checking means for coupling the first addressing means to the input means of the memory means when the recovered data is valid and for coupling the second addressing means to the input means when the recovered data is invalid, said control means including a counter, and coupling said first addressing means to the input means of the memory a specified maximum number of times if the data is invalid before coupling the second addressing means to said input means.

7. The combination claimed in claim 6 further including intermediate output signals from said control means at specified values of the counter less than said maximum for controlling external circuits.

8. The combination as claimed in claim 6 further including:
decoder means coupled to the output means of said memory means for receiving the recovered data and providing output signals for controlling external circuits; and
an inhibiting means responsive to said checking means for inhibiting the output signals of the decoder means when the output data is invalid.

9. The combination comprising:
nondestructive read out data storage means containing a plurality of addressable locations for storing data, having input means for specifying addresses and data output means;
first addressing means for specifying primary locations in said memory means;
second addressing means for specifying alternate locations in said memory means;
checking means coupled to the output means of the memory means for verifying validity of recovered data; and
control means responsive to said checking means for coupling the first addressing means to the input means of the memory means when the recovered data is valid and for coupling the second addressing means to the input means when the recovered data is invalid, said control means including a timer, and coupling said first addressing means to the input means of the memory means for a specified period of time 18 the data is invalid before coupling the second addressing means to said input means.

10. The combination claimed in claim 9 further including output signals from said timer at periods of time less than the specified period of time for controlling external circuits.

* * * * *

UNITED STATES PATENT OFFICE

CERTIFICATE OF CORRECTION

Patent No. 3,619,585 Dated November 9, 1971

Inventor(s) Richard Harvey Edmondson

It is certified that error appears in the above-identified patent and that said Letters Patent are hereby corrected as shown below:

Col. 1, line 33, "date" should be ---data---; line 68, "controls" should be ---contents---. Col. 3, line 22, "alternated" should be ---alternate---; lines 23-24, "notify" should be ---read---; line 48, "valve" should be ---value---; line 49, "valves" should be ---values---. Col. 4, line 21, "counts" should be ---count---. Col. 5, lines 7-8, "controls" should be ---control---; line 37, "present" should be ---preset---. Col. 6, line 42, "18" should be ---if---.

Signed and sealed this 9th day of May 1972.

(SEAL)
Attest:

EDWARD M.FLETCHER,JR.
Attesting Officer

ROBERT GOTTSCHALK
Commissioner of Patents